Patented June 4, 1940

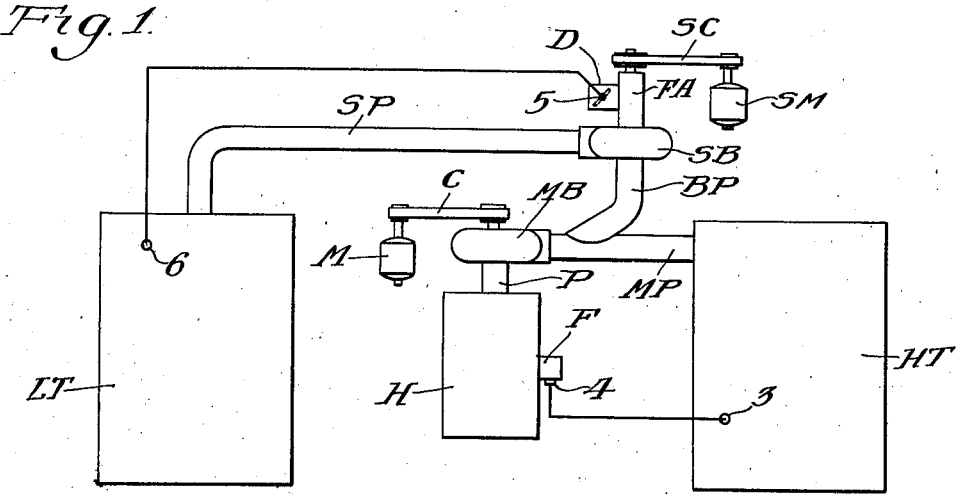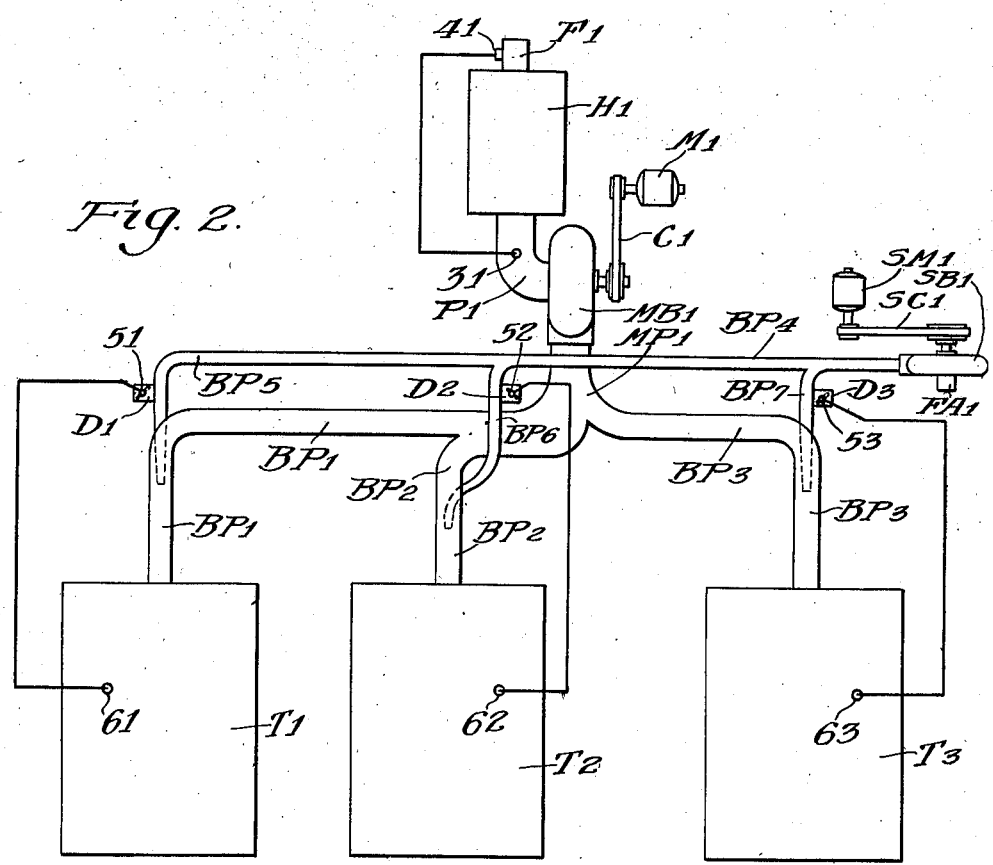

2,202,995

UNITED STATES PATENT OFFICE 2,202,995

MULTIPLE OVEN HEATING AND CONTROL SYSTEM

Samuel R. Porwancher, Chicago, Ill., assignor to Drying Systems, Inc., Chicago, Ill., a corporation of Illinois Application May 19, 1938, Serial No. 208,867

2 Claims. (Cl. 237—2)

This invention relates to heating systems such as those which comprise a plurality of enclosed areas in which desired temperatures are established and maintained by the circulation thereto of a heated fluid.

A specific example of such system is one embodying a plurality of ovens through which heated air is circulated to establish and maintain baking or drying temperatures. In such a system it is often necessary to establish and maintain different temperatures in different ovens. This may be done by providing a separate air heater for each oven but so to do is objectionable for many reasons among which are, first of all, the expense of such an arrangement which arises from the fact that two small heaters cost more than one relatively larger heater both to install and to operate, and secondly, duplication of heaters increases the operating difficulties even to the extent, in some instances, of requiring a separate attendant for each heater.

It has been proposed heretofore to avoid the necessity of providing a separate heater for each oven, in those systems or arrangements embodying a plurality of ovens, by utilizing a single heater as the source of supply of heated air for the plurality of ovens. Such a heater is so operated that a thermal head is produced sufficient to establish and maintain the desired temperature in the oven requiring the highest temperature. The desired and lower temperatures are established in the other ovens by regulating the volume of heated air supplied thereto, the volume of air supplied to such other ovens in these instances being proportionate to the temperature to be established in the respective ovens, that is, the lower temperature the less the volume. However, if the volume of air supplied to an oven is not sufficient to maintain proper circulation therein, so-called hot spots and other objectionable conditions develop in the oven and this is usually most objectionable in those ovens in which a comparatively low temperature is established and maintained. Thus prior installations employing a single source of heated fluid for a plurality of enclosed areas in different ones of which different temperatures were established and maintained have not always operated in a satisfactory manner especially where the lower of the required temperatures were established and maintained by supplying a restricted volume of heated fluid to those areas in which such lower temperatures were established and maintained.

The primary object of the present invention, however, is to employ a single source of heated fluid for a plurality of enclosed areas, such as ovens, in different ones of which it is desired to establish and maintain different temperatures, and to so regulate the temperature of heated fluid supplied to the respective areas that proper and desired temperatures will be established and maintained therein, while at the same time the volume of heated fluid supplied to such areas will be maintained great enough to avoid so-called hot spots and other objectionable conditions being present in the areas.

The nature of the service to which an enclosed area, such as an oven, in which a desired temperature is established and maintained, is to be put is determinative of the temperature and volume of heated fluid that is to be supplied thereto and usually the required, or at least, the minimum volume necessary to insure proper function of the area in a particular service may be readily ascertained. Thus another object of the present invention is to insure that the volume of heated fluid supplied to an enclosed area to establish and maintain a desired temperature therein is sufficient to effect proper functioning of the enclosed area in the service to which it is put.

A further object is to heat a fluid to a temperature higher than that to be established and maintained in an enclosed area such as an oven and to mix with this heated fluid a fluid at a lower temperature and to then supply such mixture to the enclosed area in a volume at least as great as the minimum volume which will effect proper functioning of the enclosed area in the service to which it is put, and an ancillary object is to regulate the quantity of fluid mixed with the heated fluid and thereby insure the establishment and maintenance of the desired temperature in the enclosed area, and still another ancillary object is to effect such regulation under control of the temperature in the enclosed area.

Yet another object is to employ a single source of heated fluid for a plurality of enclosed areas such as ovens and to so operate the source that a thermal head sufficient to establish and maintain the temperature desired in the area requiring the highest temperature is afforded and to mix fluid from said source with lower temperature fluid and to then supply the mixture to the other area or areas in a volume or volumes and at a temperature or temperatures which will insure proper functioning of such other area or areas in the service to which it or they are put; and objects ancillary to the foregoing are to regulate the temperature to which the fluid is heated in said source under control of the temperature in the area in which the highest temperature is established and maintained or at some other suitable place in the system where a comparatively high temperature is established and maintained; to regulate the temperature of the fluid supplied to said other area or areas under control of the temperature in such other area or areas; to regulate the volume of fluid at lower temperature mixed with the heated fluid and thereby regulate the temperature of the fluid supplied to said other area or areas; and to effect such regulation of the volume of lower temperature fluid under control of the temperature in the said other area or areas.

Other and further objects of my invention will be apparent from the following description wherein reference is made to the accompanying drawing in which Figs. 1 and 2 are diagrammatic views of selected embodiments of the invention.

In the embodiment of my invention shown in Fig. 1 a heater H is employed which includes a burner F that is preferably of the fluid burning type utilizing preferably either oil or gas. When the burner F is in operation it serves to heat air which in the present instance is withdrawn from the heater H through the pipe P by the blower MB that is driven by a motor M through a belt C or the like. In some instances the products of combustion from the burner F will be mixed with air withdrawn from the heater by the blower and in other instances the products of combustion and air will be maintained separated so that air withdrawn by the blower MB will be free of the products of combustion.

In the present instance the blower MB discharges into a pipe MP that leads to an enclosed area HT, such as an oven, in which a predetermined temperature is to be established and maintained. A pipe BP leads from the pipe MP to a blower SB, which in the present instance communicates with the atmosphere through an air intake, as indicated at FA, said blower SB being driven by a motor SM through a belt SC or the like and the intake FA leading to an intake of the blower SB independent of the intake thereof to which the pipe BP is led. A pipe SP leads from the blower SB to an enclosed area LT, such as an oven.

In the present instance a temperature responsive device 3 in the area HT operates the control 4 of the burner F to regulate operation of this burner whereby the heater H is so operated that a thermal head sufficient to maintain whatever temperature the temperature responsive device 3 is set to maintain is afforded. It will be noted that air from the heater H is, in this form of my invention, directly introduced into the area HT.

A damper D is provided in the pipe FA and the control 5 therefor is operated under control of the temperature responsive device 6 in the area LT. In this way the amount of unheated air admitted into the blower SB is regulated by the temperature responsive device 6 and as the temperature in the area LT falls below that for which the device 6 is set to maintain the damper D is operated to reduce the quantity of air admitted through the pipe FA and, contrawise, when the temperature in the area LT rises above that for which the device 6 is set to maintain the damper D is operated to admit additional fresh air through the pipe FA.

As has been stated heretofore the nature of the service to which an enclosed area such as an oven is to be put is usually determinative of the temperature to be maintained therein and the volume of air that need be moved therethrough to insure proper functioning of the area in the service to which it is put. Thus, once it is ascertained what service to which an area such as the area LT is to be put, the volume of air that need be moved therethrough may be ascertained. In the present instance it is the blower SB that supplies air or other fluid to the area LT and in accordance with my invention this blower is sized or operated so as to supply to the area LT the required volume of air.

Thus in the operation of a heating system, such as that shown in Fig. 1, in accordance with my invention, the heater H is operated to afford a thermal head sufficient to maintain a desired temperature in an area such as the area HT, which will be the area of a plurality of areas, in which the highest temperature is to be maintained. Inasmuch as lower temperatures are to be maintained in any other area, which in the present instance is the area LT, it will be apparent that operation of the heater H to supply a thermal head great enough to maintain the desired temperature in the area requiring the highest temperature will afford a source of heated air or other fluid for the area or areas in which lower temperatures are to be maintained. These lower temperatures are attained by mixing with the heated fluid unheated or at least lower temperatured fluid to reduce the temperature of the heated fluid supplied to the areas as LT sufficiently to establish and maintain a desired temperature therein. It will be appreciated that the intake as FA must be sized to afford a sufficient volume of unheated or lower temperatured fluid to enable the temperature of the heated fluid supplied through the intake BP to be reduced to the temperature desired to be maintained in an area such as the area LT. It will also be recognized that the main or supply blower MB must be sized sufficiently to deliver a sufficient volume of air to both the areas HT and LT.

Another embodiment of my invention is shown in Fig. 2 and herein the heater H1 is operated to supply a thermal head sufficient to maintain a temperature higher than that to be established and maintained in any of the enclosed areas such as ovens, T1, T2, or T3. A temperature responsive device 31. in the pipe P1 leading from the heater H1, regulates operation of the control 41 of the burner F1 of the heater H1 so as to insure operation of the heater H1 in the just described manner.

A blower MB1, driven by the motor M1 through a belt C1 or the like and of a size sufficient to supply the volume of air required in the areas T1, T2 and T3 withdraws heated fluid from the heater H1 through the pipe P1 and discharges it into a pipe MP1 from which pipes BP1, BP2 and BP3 respectively lead to the areas T1, T2 and T3. A pipe BP4 leads from a blower SB1 which includes an intake FA1 and which blower is driven by a motor SM1 through a chain SC1 or the like. Branch pipes BP5, BP6 and BP7 respectively lead into the pipes BP1, BP2 and BP3. A damper D1 in the pipe or conduit BP5 includes a control 51 that is operated by the temperature responsive device 61 in the area T1 and a damper D2 in the pipe BP6 includes a control 52 that is operated by the temperature responsive device 62 in the area T2 while a damper 63 in the pipe BP7 includes a control 53 that is operated by a temperature responsive device 63 in the area T3.

In the form of my invention shown in Fig. 2 the heater H1 is operated under control of the temperature responsive device 31 to establish and maintain a thermal head higher than that required in any of the areas T1, T2 and T3. The blower MB1 is then set in operation and through the pipes BP1, BP2 and BP3 heated fluid is supplied to the areas T1, T2 and T3 respectively to establish the temperatures respectively desired in these three areas or ovens.

The blower SB1 will be in operation at this time but each of the dampers D1, D2 and D3 will be closed. However, as soon as the desired temperature is established in the oven T1, the temperature responsive device 61 operates the control 51 to thereby admit into the pipe BP1 from the pipe BP5 lower temperature fluid from the blower SB1 and in the course of operation of the oven T1 the device 61 operates the control 51 to increase or reduce the quantity of air admitted from the pipe BP5 into the pipe BP1 as the temperature in the area T1 rises or lowers and in this way the temperature desired is established and maintained in the area T1.

In a similar manner the temperature responsive devices 62 and 63 respectively operate the controls 52 and 53 and thereby respectively regulate operation of the dampers D2 and D3 so as to control the amount of lower temperature fluid respectively admitted through the pipes BP6 and BP7 into the pipes BP2 and BP3.

It is believed that it will be apparent that in the form of the invention shown in Fig. 2 that a different temperature may be established and maintained in each of the various areas or ovens T1, T2 and T3, it only being necessary that the thermal head maintained under control of the temperature responsive device 31 be sufficient to establish and maintain the highest of the desired temperatures in any one or more of the ovens T1, T2 or T3. Furthermore instead of merely employing a single blower as SB1, a plurality of blowers could be employed, one in each of the branch pipes BP5 and BP7 ahead of the dampers in these pipes, such blowers, of course functioning in a manner similar to the single blower SB1 being for the same purpose.

It will be manifest from the foregoing description that my novel invention enables a single source of heated fluid to be employed to establish and maintain temperatures in a plurality of enclosed areas, such as ovens, in different ones of which different temperatures are to be established and maintained. My invention primarily resides in providing a thermal head sufficient to establish and maintain the temperature desired in the area in which the highest of the different temperatures is to be established and maintained. Then by supplying heated fluid to the other areas in a volume sufficient to insure proper functioning of these areas in the service to which they are put, the desired temperatures may be established and maintained in these other areas by controlling the volume of unheated or at least lower temperature fluid mixed with the fluid from the single source of heated fluid.

While I have illustrated and described selected embodiments of my invention it is to be understood that these are capable of variation and modification and I therefore do not wish to be limited to the precise details set forth but desire to avail myself of such changes and alterations as fall within the scope of the following claims.

I claim:

1. In a heating system including a plurality of enclosed areas such as ovens, and means for supplying heated air to each of said areas in a volume and at a temperature sufficient to insure proper operation in each area in the service to which it is put without restricting the flow of heated air to said areas, including a heater, air forcing means for delivering air heated in said heater to each of said areas, temperature responsive devices one located in each of said areas, means independent of the heated air delivering means and operable to supply air at a temperature lower than the temperature of air heated in said heater to all of said areas, and individual means controlled by each of said temperature responsive devices and operable to effect admission of lower temperature air to the area with which it is associated when temperature therein rises above a predetermined temperature and to restrict the admission of lower temperature air when the temperature in said area falls below a predetermined temperature to thereby control the temperature of said area without reducing the volume of the heated air flowing through said area whereby the volume of air flowing into such area will be increased as the temperature is lowered by said lower temperature air.

2. In a heating system including a plurality of enclosed areas such as ovens, and means for supplying heated air to each of said areas in a volume and at a temperature sufficient to insure proper operation in each area in the service to which it is put without restricting the flow of heated air to said area including a heater, air forcing means for delivering air heated in said heater to each of said areas, a temperature responsive device in the heated air delivery means and responsive to the temperature of air passing to said air delivery means from said heater and operable to effect such operation of said heater that the air will be heated therein to a temperature sufficiently high to establish and maintain the highest temperature required in any one or more of said areas, individual temperature responsive devices one located in each of said areas, means independent of the heated air delivering means and operable to supply air at a temperature lower than the temperature of air heated in said heater to all of said areas, and an individual means controlled by each of said individual temperature responsive devices and operable to effect admission of lower temperature air to the area with which it is associated when the temperature therein rises above a predetermined temperature and to restrict the admission of lower temperature air when the temperature in the area falls below a predetermined temperature to thereby control the temperature of said area without reducing the volume of the heated air flowing through said area whereby the volume of air flowing into such area will increase as the temperature is lowered by said lower temperature air.

SAMUEL R. PORWANCHER.